United States Patent Office 3,380,497
Patented Apr. 30, 1968

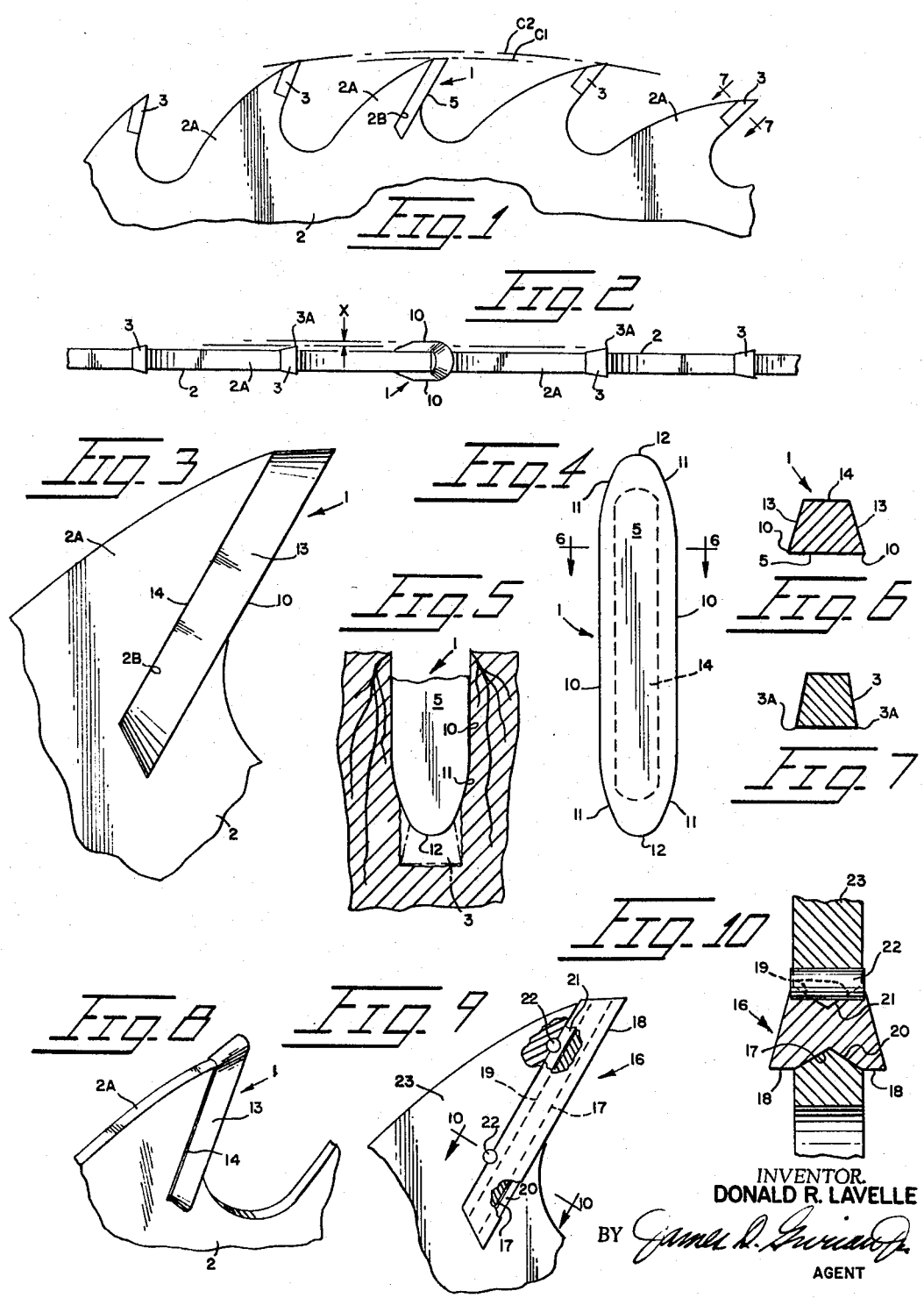

3,380,497
PLANING SAW
Donald R. La Velle, 2225 E. Main St.,
Cottage Grove, Oreg. 97424
Filed Jan. 17, 1966, Ser. No. 521,073
1 Claim. (Cl. 143—140)

ABSTRACT OF THE DISCLOSURE

A saw body having both cutter and planer teeth mounted along its periphery for simultaneously cutting and planing the surface of a kerf formed in the material being sawn. A plurality of planer teeth of the same configuration are disposed in a rearwardly inclined manner relative to peripheral movement of the saw and have rounded ends with the outer end of each planer tooth travelling a path slightly inward of a path of the outer end of a cutter tooth.

---

This invention relates generally to power driven saws and more particularly to improvements in the tooth elements of such saws including the provision of planing or planer teeth of new and novel configuration.

An important object of the present invention is the provision of a tooth carried by a power driven member such as a blade or circular disk which progressively engages the sidewalls of a kerf cut by ordinary cutter teeth and dressing the same to provide a smooth, scar-free surface obviating the additional task of sanding or planing of the surface so formed.

A further object of this invention is the provision of a planer tooth of the insert type having an elongated planing face terminating at its opposite ends in a curved edge. While saws have previously included teeth for the sole purpose of planing the kerf walls, they have for the most part proved unsatisfactory for various reasons, the most germane of which is their inability to dress the sidewall of a kerf to the standard of mechanical sanding means.

This inadequacy of the planing teeth presently available is primarily attributable to the tooth face which characteristically is rectangular or straight sided in plan view. In the engagement of such a planing tooth against the wall of the kerf, a scar is left from the angularly related edges defining the perimeter of the tooth face, the depth of which increases upon any out of true condition or wobbling of the saw member. Prior to further use of the lumber such scars must be removed by a sanding operation the same as is necessary for lumber cut by saws having no planer teeth.

A still further object is the provision of a planing tooth of the insert type which permits replacement thereof without removing the saw member from its arbor. While insert type cutting teeth or bits are common in the art, the provision of a removably mounted planing tooth is believed a distinct advancement and particularly so when applied to edger saws. Lumber after being cut from a log by a rip saw is cut to marketable widths by an edger machine having from two to six circular saws carried by a single arbor. Replacement of planing teeth fixedly secured by silver solder or brazing to the saw disc of any circular saw requires the removal of the saw disc from the arbor to accomplish the task of unsoldering. This is particularly time-consuming where edger saws are involved in view of the common practice of having the saw discs removable from only one end of the arbor. Accordingly, the replacement of only one such tooth on the saw disc opposite the removal end of the arbor can necessitate the removal of all such saw discs from the arbor.

Planing teeth formed integrally with the saw by swaging and shaping portions thereof have not proved satisfactory because of their susceptibility to relatively rapid wear by reason of the lower quality of the steel used in the saw member.

These and other objects will become subsequently apparent upon a reading of the following specification and drawings in which:

FIGURE 1 is a side elevational, fragmentary view of a circular saw body embodying a planer tooth of the present invention.

FIGURE 2 is a plan view of FIGURE 1.

FIGURE 3 is a side elevational view of the planer tooth of FIGURE 1 on an enlarged scale.

FIGURE 4 is a front, elevational view of the face of the planer tooth removed from its supporting saw body.

FIGURE 5 is a fragmentary, elevational view of the planer tooth operatively disposed within a kerf.

FIGURE 6 is a sectional view taken along the line 6—6 of FIGURE 4.

FIGURE 7 is a sectional view of a cutter tooth taken approximately along line 7—7 of FIGURE 1.

FIGURE 8 is a perspective view of the planer tooth and a fragment of the associated saw body.

FIGURE 9 is a view similar to FIGURE 3 showing a modified form of planer tooth in pinned engagement with the saw member.

FIGURE 10 is an enlarged sectional view of the modified form of tooth taken along line 10—10 of FIGURE 9.

With continuing reference to the drawing and particularly FIGURE 1 thereof, a planer tooth is indicated generally at 1 operatively mounted on the circumference of a saw body 2 in the form of a disc apertured centrally for mounting in the usual manner upon a powered shaft or arbor and provided with peripherally disposed cutter teeth 3. Although the teeth 3 are shown as being of the inset type, the planer teeth of the present invention are equally adaptable to saw members having spring set or swage set cutter teeth integral with the saw body all being used to some extent in rip and edger saws. Inset teeth are, however, predominantly used for the sake of increased operational periods between sharpenings by reason of their being of extremely hard materials such as carbide.

The planer tooth 1 is typical of identical planer teeth mounted about the periphery of the saw body in a desired ratio to the cutting teeth 3. For example, in a circular saw having a total of twenty-five teeth, it has been found practical to have five of the teeth in the form of evenly spaced planer teeth or in other words the first, fifth, tenth, fifteenth and twentieth teeth are planer teeth. Satisfactory results have been attained with a higher ratio of cutter teeth to planer teeth but with some reduction in the duration of operational periods between sharpenings.

The planer teeth have their outermost ends located at the same radial distance in common with a circle C1 and slightly inward from a circle C2 containing the outermost ends of the cutter teeth 3 for purposes hereinafter elaborated upon. The face of the planer tooth is indicated at 5 and is inclined rearwardly and downwardly relative to the saw's peripheral movement similar to the hook angle of the face of the cutting teeth 3. The cutting teeth 3 are inset within a shoulder portion 2A of the saw body 2 and secured therein customarily by silver solder or brazing. The shoulder portion 2A receiving the planer tooth 1 is slotted inwardly as at 2B a distance substantially equal to the length of the planer tooth which is secured therein in accordance with the first form of the invention by silver solder.

The face 5 of tooth 1, as best shown in FIGURE 4, is defined by a pair of parallel vertical edges 10 gradually merging with inwardly curved edges as at 11 relative to the tooth's longitudinal axis and terminating in a rounded end portion 12. The planing action of the tooth is performed by segments of the gradually curving edges 11 along with the intermediate parallel vertical edges 10 as they sweep into angular contact with the sidewalls of the kerf, as shown in FIGURE 5.

As indicated in FIGURE 2 on a slightly exaggerated scale, the edges 10 of the planer teeth travel a path laterally offset as at $x$ from the corresponding edge 3A of the cutter tooth 3. From this it will be seen that the kerf cut by the teeth 3 will freely receive the rounded end portion 12 of the planer tooth 1 with initial contact of the planer tooth against the sidewall of the kerf occurring at a transversely disposed point on the gradually inward curving edges 11, as seen in FIGURE 5. The planing tooth by reason of curved edges 11 progressively engages the sidewall of the kerf in a gradual manner thus restricting to a minimum the feathering of the wood fibers.

The side faces 13 of the planer tooth taper rearwardly from its face to a back wall 14 which is substantially equal in section to the width of the shoulder portion 2A of the saw member.

A modified form of planer tooth is indicated generally at 16 in FIGURES 9 and 10 and is of the same configuration as the previously described planer tooth as regards the planing edges thereof. The provision of a pair of V-shaped grooves, one being centrally formed as at 17 along the face 18 of the tooth and the other forming a back wall 19 thereof allow mounting of the insert type tooth within a slot formed in the shoulder portion 23 of the saw and beveled as at 20 and 21. The modified form of tooth is locked in place within the slot by press fitted pins 22 which extend transversely of the back wall 19 of the tooth.

In addition to the planing advantages of the first form of tooth mentioned, the modified tooth may be removed from the saw body without the latter being removed from the arbor while silver soldering or brazing in place of insert teeth necessitates the removal of the saw body to a saw shop. As aforementioned, the modified planer tooth is particularly practical on edger saws in which the breakage of a single planer tooth can result in the time consuming removal of up to six saw discs from the common arbor.

Both forms of planer teeth are sharpened by resurfacing of their faces with a diamond compound grinding wheel. Obviously only the planing edges, that is, parallel edges 10 and inwardly curving edges 11, need be sharpened by such grinding. While such resurfacing will decrease slightly the transverse dimension of the planer tooth face the offset $x$ of the latter's planing edges will remain sufficient by reason of similar resurfacing of the cutting teeth 3. In the modified planer tooth such grinding may be performed either with the tooth in place on the saw member or removed therefrom.

While I have shown particular forms of embodiment of my invention, I am aware that many minor changes therein will readily suggest themselves to others skilled in the art without departing from the spirit and scope of the invention.

Having thus described my invention, what I claim as new and desire to protect by Letters Patent is:

1. In a circular saw body having a plurality of cutter teeth provided on its periphery having their outermost ends equally offset from the center of said saw body, the improvement comprising, said saw body having inwardly extending slotted openings formed in its periphery and inclined rearwardly relative to the rotation of the saw body, at least two planer teeth each comprising an elongated tooth body having a flat back wall and a flat face portion and each tooth inset within one of said openings in a manner providing a hook angle for said planer teeth substantially equal to the hook angle of the cutter teeth with said planer teeth having their outermost ends slightly inward of the path of the ends of said cutter teeth, said face portion defined by parallel side edges merging at their ends with curved inwardly converging edges, said parallel edges and a portion of said curving edges laterally offset from the sidewalls of a kerf formed by the cutting teeth whereby said planer teeth will initially engage the sidewalls of the kerf at transversely spaced points on said curved edges with subsequent planing action being performed by said curved and parallel edges in a gradual and progressive manner minimizing feathering of the wood fibers.

References Cited
UNITED STATES PATENTS

| | | | |
|---|---|---|---|
| 347,008 | 8/1886 | Proctor | 143—143 |
| 465,051 | 12/1891 | Achorn | 143—145 |
| 2,071,618 | 2/1937 | Ferrari et al. | 143—133 |
| 2,657,720 | 11/1953 | Wolfe | 143—140 |
| 2,913,024 | 11/1959 | Key | 143—143 |

DONALD R. SCHRAN, *Primary Examiner.*